(12) United States Patent
Stecko et al.

(10) Patent No.: US 8,370,002 B2
(45) Date of Patent: Feb. 5, 2013

(54) MULTI-MISSION REMOTE AERIAL REFUELING OPERATOR SYSTEM

(75) Inventors: Stephen M. Stecko, Fullerton, CA (US); Ronald G. Benjamin, Tucson, AZ (US); Harry Wilbert Slusher, Fountain Valley, CA (US); James M. Condon, Mission Viejo, CA (US); Stanley S. Lew, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 673 days.

(21) Appl. No.: 12/418,228

(22) Filed: Apr. 3, 2009

(65) Prior Publication Data

US 2010/0256838 A1    Oct. 7, 2010

(51) Int. Cl.
*G05D 1/00* (2006.01)
(52) U.S. Cl. ........... 701/3; 244/75.1; 244/220; 244/221; 244/234; 340/945; 340/971
(58) Field of Classification Search .................. 701/1, 3
See application file for complete search history.

(56) References Cited

U.S. PATENT DOCUMENTS

| | | | | |
|---|---|---|---|---|
| 4,298,176 | A | * | 11/1981 | Kendall .................... 244/135 A |
| 4,658,359 | A | * | 4/1987 | Palatucci et al. ................ 701/14 |
| 5,499,784 | A | * | 3/1996 | Crabere et al. ............ 244/135 A |
| 5,530,650 | A | * | 6/1996 | Biferno et al. ................ 701/300 |
| 6,873,886 | B1 | | 3/2005 | Mullen et al. |
| 6,889,123 | B2 | | 5/2005 | Wittenberg |
| 7,093,798 | B2 | * | 8/2006 | Whelan et al. ................ 244/120 |
| 7,689,594 | B2 | * | 3/2010 | Davidson et al. ............. 707/781 |

FOREIGN PATENT DOCUMENTS

| | | | |
|---|---|---|---|
| DE | 3440812 | * | 5/1986 |
| RU | 2231478 | * | 6/2004 |
| WO | WO2007057189 | * | 5/2007 |

OTHER PUBLICATIONS

Coskuner, Multimission Aircraft Design Study—Operational Scenarios, Mar. 2003, Master's Thesis, Air Force Institute of Technology, Retrieved from http://www.dtic.mil/cgi-bin/GetTRDoc?AD=ADA412889&Location=U2&doc=GetTRDoc.pdf.*

Martin et al., A Simulation of the Mission Crew Workload in a Multi Mission Aircraft, 2001, Proceedings of the 2001 Winter Simulation Conference, vol. 1, pp. 684-690.*

Gangkofer et al., Transitioning to Integrated Modular Avionics with a Mission Management System, Oct. 2000, Presented at the RTO SCI Symposium on "Strategies to Mitigate Obsolescence in Defense Systems Using Commercial Components" and published in RTO MP-072, pp. 15-1-15-12.*

Gangkofer et al., Transitioning to Integrated Modular Avionics with a Mission Management System, 2000.*

* cited by examiner

*Primary Examiner* — Thomas Black
*Assistant Examiner* — Sara Lewandroski
(74) *Attorney, Agent, or Firm* — Yee & Associates, P.C.

(57) ABSTRACT

A method for performing missions with a refueling aircraft. A number of control stations are configured to selectively control a plurality of systems in the refueling aircraft to form a number of configured control stations. The plurality of systems includes a refueling system and a number of other systems. Each of the plurality of systems is capable of performing a different mission. A number of missions are performed during flight using the number of configured control stations.

20 Claims, 15 Drawing Sheets

Passenger-Cargo Load

FLIGHT SUMMARY

CALL SIGN: BEACON 25  DEST/ETA: RAMSTEIN/1025 0951Z  DEP/LOC TIME: KBGD/1024/1147Z  ETE: 10+04  ON TIME

ENROUTE ALT: FL370  PRESENT ALT: CLB FL278  CABIN ALT: 5800 FT  ZONE TEMPS: 1-72F 2-74F 3-76F

PAYLOAD: 87  CARGO LOAD: 27 PALLETS 63,485 LBS  PAYLOAD CALCULATIONS
LIST  LIST

PASSENGER MANIFEST (TELE DOWNLOAD KBCD)

| SEAT | NAME | UNIT/RANK | DESTINATION |
|---|---|---|---|
| 3A | Cervantes, M L  USA | 456 BW/SMS | MILDENHALL UK |
| 3B | Poe, E A  USAF | 555 FW/Capt | RAMSTEIN |
| 3C | Morris, P  RAF | 342 FSQ/Maj | LANSTHUL |
| 3D | Decker, B N  USAF | 384 MAINT/A1C | DOVER AFB, DEL |
| 3E | Hammer, A R  USMC | 3D MAR DIV/LCpl | CAMP LEJUNE NC |
| 3F | Lowrey, S S  USA | 82ND ABRN/Spec 3 | FT BENNING GA |

CUSTOMS DECLARATIONS

DESTINATION NOTICES AND UPDATES/NOTAMS

[CARGO LOAD PLAN]  [PAX LOAD PLAN]

Seat map: rows 3–9, columns A B C  D E F

[SECOND ARO]  [ARO INSTRUCTOR]  [MED EVAC]  [PASSENGER-CARGO]  [ALTERNATE MISSION]

*FIG. 10*

MEDEVAC MAIN PAGE

FLIGHT SUMMARY KC-777A AMMR

*CALL SIGN:* BEACON 25  *DESTINATION/ETA:* RAMSTEIN/1025 0951Z  *DEPARTURE/LOC TIME:* KBGD/1024/1147Z

*CURRENT ALT:* FL330  *CABIN PRESS:* 12.5 PSI / 7.4 PSID PO2: 89%

*PATIENTS TOT:* 31  AMB: 25  CRITICAL: 6  ALS: 1

CRITICAL PATIENTS / STATUS LOOKUP

| LITTER | NAME | RANK | STATUS |
|---|---|---|---|
| 3 | Cervantes, M L  USA | SMS | CRIT |
| 4 | Poe, E A  USAF | Capt | EX CRIT |
| 6 | Morris, P  RAF | Maj | CRIT |
| 7 | Decker, B N  USAF | A1C | SERIOUS (UPGR) |
| 8 | Hammer, A R  USMC | LanceCpl | EX CRIT |
| 9 | Lowrey, S S  USA | Spec 3 | SERIOUS |

PHYSICIANS NOTES

AMBULATORY PATIENTS / STATUS LOOKUP

[SECOND ARO]  [ARO INSTRUCTOR]  [MED EVAC]  [PASSENGER-CARGO]  [ALTERNATE MISSION]

*FIG. 12*

MULTI-MISSION REMOTE AERIAL REFUELING OPERATOR SYSTEM

BACKGROUND INFORMATION

1. Field

The present disclosure relates generally to performing aerial missions, and in particular, to a method and apparatus for performing multiple aerial missions using an aircraft. Still more particularly, the present disclosure relates to a method and apparatus for performing multiple aerial missions with a refueling aircraft.

2. Background

Modern aircraft that have the capability of transferring fuel to another aircraft while in flight are commonly referred to as tanker aircraft, tankers, or refueling aircraft. These refueling aircraft generally use permanently installed fuel tank systems and fuel transfer systems. The fuel transfer systems used may be either a hose and drogue system or a boom system. The hose and drogue system employs a flexible hose with a receiver drogue at the end of the hose that trails behind the refueling aircraft. The receiver aircraft is capable of engaging the drogue, and fuel is pumped to the receiver aircraft. The boom system employs a rigid, telescoping boom attached to the aft end of the refueling aircraft. The location of the boom may be controlled by aerodynamic surfaces mounted to the boom. The boom has a fitting capable of engaging a receptacle in the receiver aircraft for the transfer of fuel to the receiver aircraft.

When a number of receiver aircraft require refueling around the same time period, benefits may be provided by a refueling aircraft capable of servicing multiple aircraft simultaneously through the use of multiple booms and/or multiple hose and drogue systems.

Currently, the many different airborne missions are conducted through the use of many different specialized aircraft. When no specific mission for a highly specialized aircraft is present, the aircraft may remain idle until a specific mission is tasked. Further, large fleets of dedicated aircraft incur higher costs for acquisition, systems support, parts inventories, servicing requirements, crew training, and other such expenses. Employing large fleets of dedicated aircraft imposes budget strains and increases response time to a need for specialized assets.

In other words, having different aircraft dedicated to specific missions increases the expense to perform missions. The expense may arise from the cost of purchasing the aircraft and/or maintaining the aircraft. Maintenance costs of aircraft while they remain idle when no specific mission is present for the aircraft also add to the increased expense. Further, increased numbers of personnel and crew members are required to maintain the aircraft.

Therefore, it would be advantageous to have a method and apparatus that takes into account one or more of the issues discussed above, as well as possibly other issues.

SUMMARY

In one advantageous embodiment, a refueling aircraft comprises a fuselage, a plurality of flight surfaces; an engine system; a refueling system, a number of other systems, and a number of control stations. The plurality of flight surfaces is associated with the fuselage. The engine system is capable of moving the refueling aircraft during flight. The refueling system is capable of performing a refueling mission during the flight. Each of the number of other system is capable of performing a number of missions in addition to the refueling mission. The number of control stations are located in the fuselage of the refueling aircraft. Each of the number of control stations is capable of being configured to control any of the refueling system and the number of other systems prior to performing a selected mission.

In another advantageous embodiment, a method is present for performing missions with a refueling aircraft. A number of control stations are configured to selectively control a plurality of systems in the refueling aircraft to form a number of configured control stations. The plurality of systems includes a refueling system and a number of other systems. Each of the plurality of systems is capable of performing a different mission. A number of missions are performed during flight using the number of configured control stations.

In yet another advantageous embodiment, an apparatus comprises a control station located in a fuselage of a refueling aircraft and a mission configuration system. The control station is capable of being configured to control any of a refueling system and a number of other systems prior to performing a selected mission. The mission configuration system is connected to the refueling system in the refueling aircraft, the number of other systems in the refueling aircraft, and the control station. The mission configuration system is capable of facilitating an exchange of information between the refueling system, the number of other systems, and the control station.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 10 is an illustration of a graphical user interface for use at a control station in accordance with an advantageous embodiment;

FIG. 12 is an illustration of a graphical user interface for use at a control station in accordance with an advantageous embodiment;

DETAILED DESCRIPTION

Figure 1:
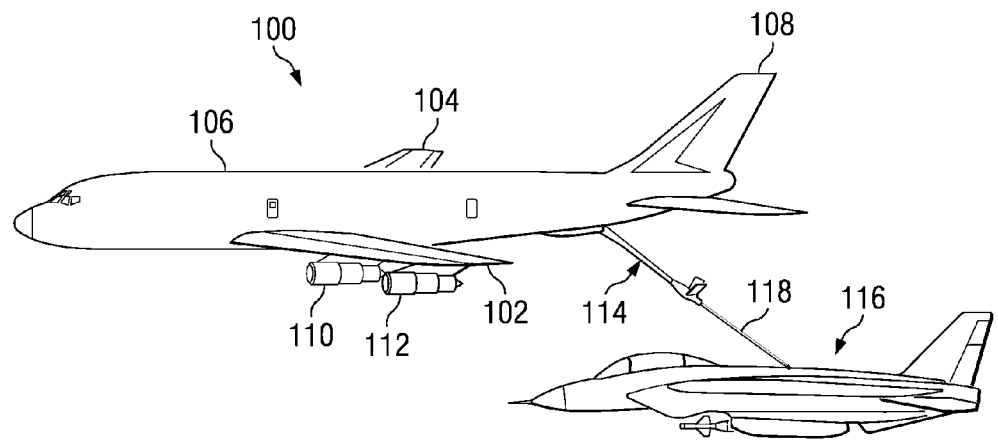
FIG. 1 is a diagram of an aircraft in which an advantageous embodiment may be implemented.

With reference now to the figures, and in particular, with reference to FIG. 1, a diagram of an aircraft is depicted in which an advantageous embodiment may be implemented. Aircraft 100 is one example of a refueling aircraft capable of refueling tasks. Further, aircraft 100 may be a refueling aircraft capable of having a multi-mission system for performing multiple missions.

In this illustrative example, aircraft 100 has wings 102 and 104 attached to body 106. Aircraft 100 includes tail 108 and wing mounted engines 110 and 112 on wing 102. Wing 104 also has wing mounted engines that are not seen in this particular view.

Further, aircraft 100 has refueling boom 114 attached to the rear of aircraft 100. In this illustrative example, refueling boom 114 is a tube used to transfer fuel from aircraft 100 to receiver aircraft 116. In addition, refueling boom 114 has telescoping tube 118, which extends from refueling boom 114. In these examples, telescoping tube 118 is used to attach refueling boom 114 to a receptacle on receiver aircraft 116.

Figure 2:
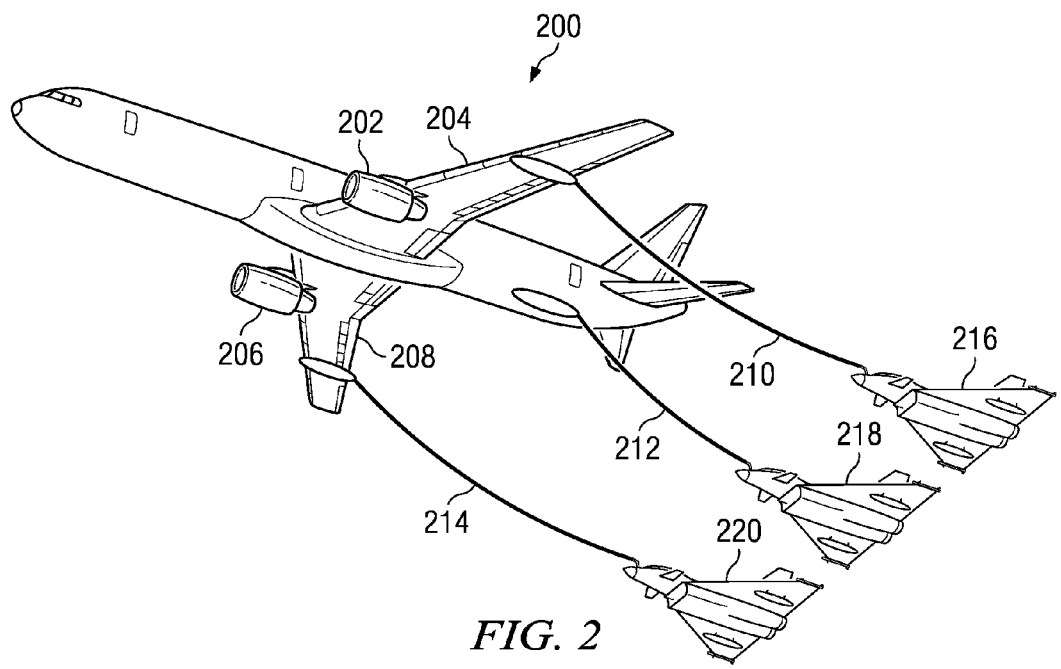
FIG. 2 is an illustration of an aircraft in accordance with an advantageous embodiment.

With reference now to FIG. 2, an illustration of an aircraft is depicted in accordance with an advantageous embodiment. In this illustrative example, aircraft 200 may be another example of a refueling aircraft similar to aircraft 100 in FIG. 1. Aircraft 200 also may include a multi-mission system. In this example, aircraft 200 has wing mounted engine 202 on wing 204 and wing mounted engine 206 on wing 208.

Further, aircraft 200 has drogue system 210, drogue system 212, and drogue system 214. Drogue system 210 transfers fuel to receiver aircraft 216 and drogue system 212 transfers fuel to receiver aircraft 218. Further, drogue system 214 transfers fuel to receiver aircraft 220.

Figure 3:
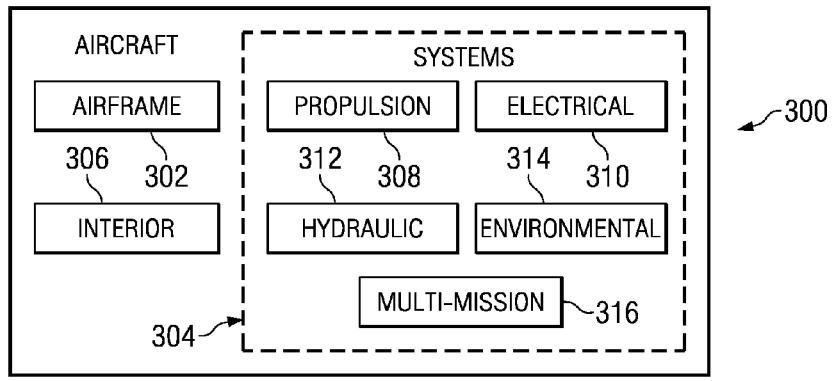
FIG. 3 is a diagram of an aircraft in which an advantageous embodiment may be implemented.

With reference now to FIG. 3, a diagram of an aircraft is depicted in which an advantageous embodiment may be implemented. In this example, aircraft 300 may be an aircraft such as, for example, aircraft 100 in FIG. 1 or aircraft 200 in FIG. 2. Aircraft 300 includes airframe 302 with a plurality of systems 304 and interior 306. Examples of systems 304 include one or more of propulsion system 308, electrical system 310, hydraulic system 312, environmental system 314, and multi-mission system 316. In the illustrative examples, multi-mission system 316 may include systems such as, for example, without limitation, a refueling system, a cargo handling system, a passenger transportation system, a special operations system, and/or some other suitable system. Any number of other systems may be included in multi-mission system 316 and systems 304.

The different advantageous embodiments take into account and recognize a number of different considerations. For example, the different advantageous embodiments recognize and take into account that multi-purpose aircraft may be preferable to single-purpose aircraft. The different advantageous embodiments also recognize and take into account that currently, refueling aircraft are equipped with a control station for the control and operation of booms and/or hose and drogue systems. Benefits may be realized using a number of control stations to provide added support and to control multiple refueling systems and/or other refueling tasks.

The different advantageous embodiments also take into account and recognize that in different phases of a mission, variations may be present in demand for refueling aircraft, cargo aircraft, special operations aircraft, intelligence and surveillance aircraft, medical evacuation aircraft, passenger aircraft, and/or other types of aircraft. For example, a refueling aircraft transporting cargo and/or passengers may be needed to perform aerial refueling operations during flight. In a similar manner, a refueling aircraft tasked with performing aerial refueling operations may be needed for conducting air traffic management during the same flight. Further, a demand may arise for a refueling aircraft performing aerial refueling operations to be used for an emergency medical evacuation during the same flight.

The different advantageous embodiments take into account and recognize that currently existing control stations that are configurable for a number of missions do not exist for refueling aircraft. The use of a refueling aircraft as a multi-mission aircraft may provide a large enough aircraft to maintain optimal passenger and/or cargo capacity. Further, the use of a refueling aircraft as a multi-purpose aircraft may allow an already expensive aircraft to have multiple uses.

Thus, the different advantageous embodiments provide a refueling aircraft that can be configured to perform different missions. The refueling aircraft comprises a fuselage, a plurality of flight surfaces, an engine system, a refueling system, a number of other systems, and a number of control stations. A number, as used herein with reference to items, means one or more items. For example, a number of other systems is one or more other systems, and a number of control stations is one or more control stations. The plurality of flight surfaces is associated with the fuselage, and the engine system is capable of moving the refueling aircraft during flight. The refueling system is capable of performing a refueling mission during the flight. The number of other systems are each capable of performing another mission in addition to the refueling mission. The number of control stations is located in the fuselage of the refueling aircraft, and each of the number of control stations is capable of being configured to control any of the refueling systems and the number of other systems prior to performing a selected mission.

Figure 4:
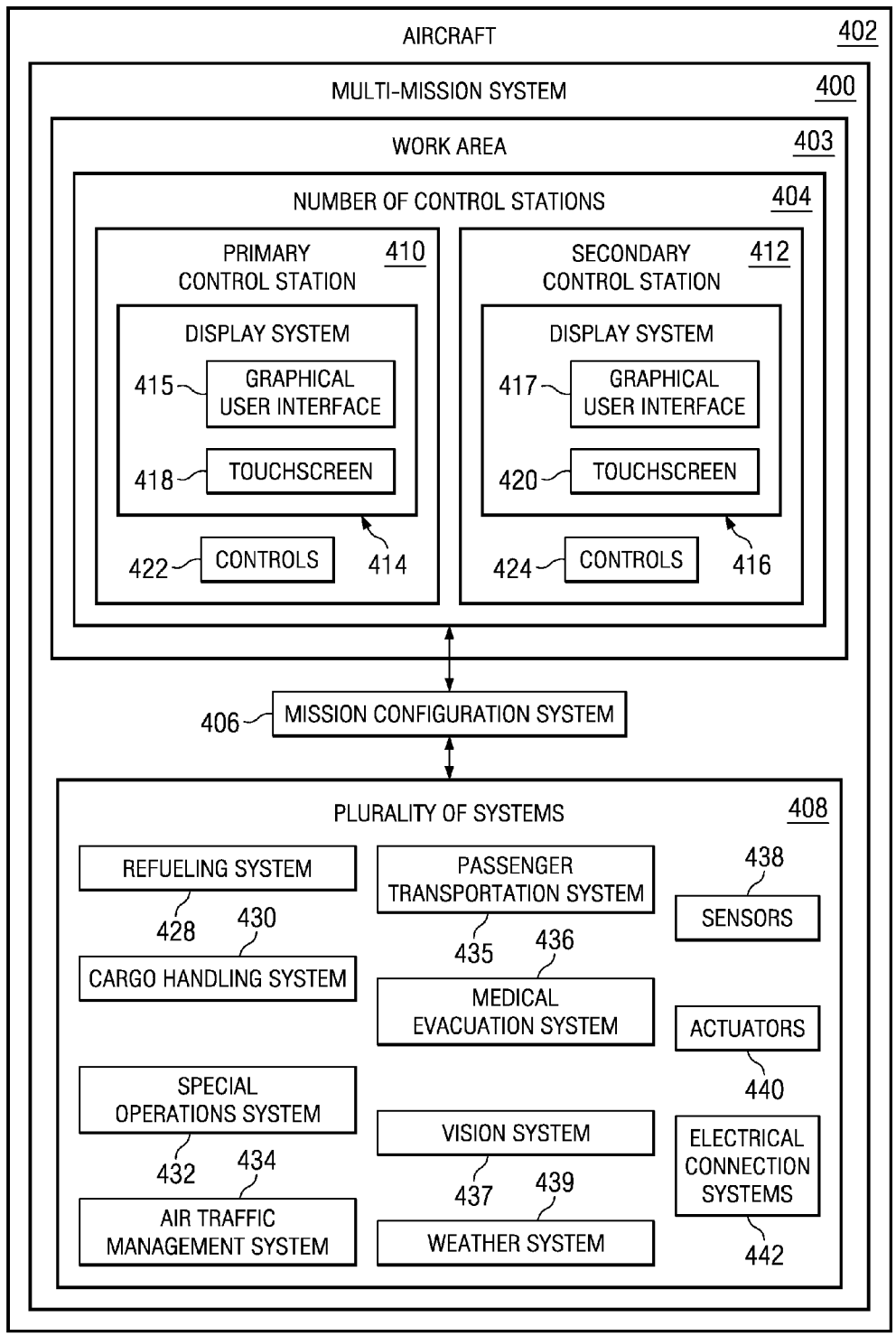
FIG. 4 is a block diagram of a multi-mission system in accordance with an advantageous embodiment.

With reference now to FIG. 4, a block diagram of a multi-mission system is depicted in accordance with an advantageous embodiment. In these examples, multi-mission system 400 is one example of one implementation of a multi-mission system such as, for example, multi-mission system 316 in FIG. 3.

In these illustrative examples, multi-mission system 400 is a system in an aircraft such as, for example, aircraft 402. Aircraft 402 is a refueling aircraft in these examples and may be similar to aircraft 100 in FIG. 1 and aircraft 200 in FIG. 2. Of course, in other advantageous embodiments, aircraft 402 may be some other type of aircraft. In these illustrative examples, multi-mission system 400 may include number of control stations 404, mission configuration system 406, and plurality of systems 408.

In these illustrative examples, number of control stations 404 may be located in work area 403 in aircraft 402. Work area 403 is a location in which number of control stations 404 may be placed or to which number of control stations 404 may be moved. Number of control stations 404 may be locations on aircraft 402 at which mission configuration system 406 and plurality of systems 408 may be controlled by a number of operators. Number of control stations 404 may include, for example, without limitation, a computer console, a laptop computer, a portable device, and/or some other suitable hardware device capable of controlling mission configuration system 406 and plurality of systems 408. In this manner, work area 403 is a work area at which a number of operators may be capable of controlling plurality of systems 408 at each of number of control stations 404.

In these illustrative examples, number of control stations 404 includes at least one of primary control station 410 and secondary control station 412. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C. Primary control station 410 and secondary control station 412 are redundant control stations that are each capable of providing an operator with an ability to control plurality of systems 408.

Primary control station 410 and secondary control station 412 have display system 414 and display system 416, respectively. Display system 414 and display system 416 may include a number of display devices. These devices may be hardware devices that display user interfaces. These hardware devices may include, for example, without limitation, computer monitors, touchscreen display devices, and/or other suitable display devices. In these illustrative examples, display system 414 and display system 416 include touchscreen display devices such as, for example, touchscreen 418 and touchscreen 420, respectively.

Display systems 414 and 416 may display graphical user interfaces such as, for example, graphical user interfaces 415 and 417, respectively. Graphical user interfaces 415 and 417 may be configured to provide a user interface for each system within plurality of systems 408.

A number of operators may control plurality of systems 408 at number of control stations 404 using controls such as, for example, controls 422 at primary control station 410 and controls 424 at secondary control station 412. In these illustrative examples, controls 422 and controls 424 may include, for example, without limitation, a number of control sticks, a number of buttons, a mouse, a track ball, a keyboard, a number of switches, and/or a number of touchscreen controls for touchscreens 418 and 420. Controls 422 and controls 424 may also include, without limitation, controls displayed on graphical user interfaces 415 and 417, respectively, which may be manipulated through the use of an input device such as a mouse, a track ball, a keyboard, and/or some other input device. Of course, controls 422 and 424 may include any number of other suitable controls.

In these illustrative examples, plurality of systems 408 includes refueling system 428 and at least one of cargo handling system 430, special operations system 432, air traffic management system 434, passenger transportation system 435, medical evacuation system 436, vision system 437, weather system 439, and/or other suitable systems. Further, plurality of systems 408 includes sensors 438, actuators 440, electrical connection systems 442, and/or other suitable components for the operation of plurality of systems 408.

Sensors 438 may include, for example, without limitation, optical cameras, video recorders, infrared cameras, position sensors, and/or other suitable sensors. Actuators 440 may include, for example, without limitation, linear actuators, hydraulic actuators, and/or other suitable actuators. Electrical connection systems 442 may include, for example, without limitation, wires, cables, data buses, and/or other suitable types of electrical connection systems and components. Sensors 438, actuators 440, and electrical connection systems 442 are used by plurality of systems 408 and may be controlled by operators at number of control stations 404.

In these illustrative examples, information collected by sensors 438 may be transmitted to mission configuration system 406 using electrical connection systems 442. The information collected by sensors 438 may be sent to number of control stations 404 by mission configuration system 406.

For example, an operator at number of control stations 404 may use the information collected by sensors 438 to control plurality of systems 408. The information collected by sensors 438 may be displayed at number of control stations 404 using graphical user interfaces 415 and 417. Using graphical user interfaces 415 and 417 and controls 422 and 424, an operator at number of control stations 404 may control sensors 438 or may affect a system within plurality of systems 408 using actuators 440 and/or some other suitable mechanism.

Refueling system 428 is capable of performing a number of refueling tasks for aircraft 402. In these illustrative examples, refueling system 428 is the primary system for aircraft 402. Refueling system 428 may include a number of refueling units such as, for example, without limitation, refueling booms and/or hose and drogue units. An operator at primary control station 410 may use controls 422 to control and operate refueling system 428. Further, an operator at secondary control station 412 may also be able to control refueling system 428 using controls 424. In this manner, primary control station 410 and secondary control station 412 may function as redundant control stations in which each control station is capable of performing a number of refueling tasks using refueling system 428.

Primary control station 410 and secondary control station 412 may also control cargo handling system 430, special operations system 432, air traffic management system 434, passenger transportation system 435, medical evacuation system 436, vision system 437, and weather system 439. Cargo handling system 430 is used when aircraft 402 transports cargo. Special operations system 432 is used to perform surveillance tasks, intelligence gathering tasks, reconnaissance tasks, and/or other suitable types of tasks. For example, special operations system 432 may be used to monitor activity on the ground, in the water, under the water, and/or in the air. This system also may be used to plan and/or control movement of people, ground vehicles, aircraft, ships, and/or other suitable assets for a mission.

In these illustrative examples, air traffic management system 434 may be used to supplement the capabilities of airborne warning and control aircraft. Air traffic management system 434 may also be used to manage the flight formation of multiple aircraft.

Further, passenger transportation system 435 is used to transport passengers. Passengers may include military troops, civilians, crew members, and/or other personnel in these illustrative examples. For example, passenger transportation system 435 may be used to evacuate military troops from dangerous locations and/or situations, such as combat zones. As another example, passenger transportation system 435 may be used to transport civilians, such as refugees.

Medical evacuation system 436 is a system used to evacuate sick and/or injured personnel. For example, medical evacuation system 436 may be used to evacuate sick and/or injured military troops. Medical evacuation system 436 may also be used to communicate medical status and diagnosis information with ground systems and/or hospitals. When a control station within number of control stations 404 is used to control and operate medical evacuation system 436, that control station may also be used as a nursing station.

In these examples, vision system 437 provides imaging capabilities for aircraft 402. For example, without limitation, vision system 437 may be used to improve performance of aerial tasks in darkness and/or inclement weather. In some advantageous embodiments, vision system 437 may improve the performance of aerial tasks using three-dimensional digital imagery. Vision system 437 may rely on data collected by sensors 438 in the form of infrared cameras, stereoscopic cameras, night vision cameras, and/or other types of sensors.

Weather system 439 is used to gather information about weather conditions. For example, weather system 439 may use sensors 438 to collect weather information. These sensors may take the form of thermometers, barometric pressure sensors, wind speed sensors, wind direction sensors, radar devices, and/or other types of sensors. In some advantageous embodiments, weather system 439 may gather information about weather conditions from ground systems and/or a ground weather station.

In these illustrative examples, mission configuration system 406 facilitates an exchange of information between number of control stations 404 and plurality of systems 408. Mission configuration system 406 allows a control station such as, for example, without limitation, primary control station 410 in number of control stations 404, to control any one or more of plurality of systems 408. The control of a particular system in plurality of systems 408 may be changed between flights or during flight, depending on the particular implementation.

Mission configuration system 406 may include components such as, for example, without limitation, a switch, a router, a computer, a processor unit, a controller, and/or other devices used to transfer information between number of control stations 404 and plurality of systems 408. In these examples, information may be any information needed to perform a mission. For example, without limitation, information may include sensor data, alerts, log information, commands, programs, and/or other suitable information.

Mission configuration system 406 may receive operator input from controls 422 and controls 424. An operator at number of control stations 404 may manipulate controls 422 and 424 and graphical user interfaces 415 and 417 to interact with different systems within plurality of systems 408.

For example, an operator may control refueling system 428 at primary control station 410. A second operator may control a different system within plurality of systems 408 at secondary control station 412. The operators may control these systems simultaneously during flight.

In other advantageous embodiments, an operator may configure a control station within number of control stations 404 to control a specific system within plurality of systems 408 prior to flight. Number of control stations 404 can be configured by using graphical user interfaces 415 and 417 along with mission configuration system 406. For example, an operator manipulates controls 422 and graphical user interface 415 to send a command to mission configuration system 406 to select one system within plurality of systems 408. This command also allows graphical user interface 415 to display a particular user interface for the selected system on display system 414 for primary control station 410.

In other advantageous embodiments, the functionality of controls 422 and controls 424 may be changed prior to flight. A change in the functionality of these controls allows selective configuration of number of control stations 404. For example, a control stick that controls the movement of a refueling boom may be reconfigured to control the movement of a set of cameras. In these depicted examples, the functionality of these controls may be changed by sending input through controls displayed using graphical user interfaces 415 and 417. In other examples, the functionally of these controls may be changed by flipping a physical switch.

Further, in other advantageous embodiments, an operator may be able to control multiple systems from the same control station within number of control stations 404. For example, an operator may use graphical user interface 415 and controls 422 to control and operate both refueling system 428 and air traffic management system 434 at primary control station 410. As another illustrative example, one or more operators at number of control stations 404 may control and operate more than one system within plurality of systems 408 to perform a mission. In these illustrative examples, the mission may include one or more tasks. A task is a piece of work to be performed. Further, a task that is performed individually may be a mission. In this manner, plurality of systems 408 may be integrated through mission configuration system 406 and number of control stations 404 to perform a mission involving a number of tasks.

For example, an operator may configure primary control station 410 or secondary control station 412 to control cargo handling system 430. This configuration may make aircraft 402 capable of being used to transport cargo. In this particular example, aircraft 402 may be fitted with specific equipment necessary for cargo handling such as, for example, conveyors, lifting equipment, equipment for tying down cargo, and/or other such equipment.

In some advantageous embodiments, primary control station 410 may control and operate refueling system 428. Secondary control station 412 may be used to train and supervise operators of refueling system 428 in these examples. For example, secondary control station 412 may be used as a failsafe control station that performs refueling tasks. Secondary control station 412 may be used in this capacity if a condition occurs with primary control station 410 that requires a different control station. Further, secondary control station 412 may be used by an instructor or supervisor in training missions. For example, a supervisor or instructor at secondary control station 412 may take over refueling tasks for a trainee and control refueling system 428 if needed during a training mission.

The illustration of multi-mission system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in other advantageous embodiments, number of control stations 404 may include only primary control station 410. In this illustrative example, primary control station 410 is capable of controlling plurality of systems 408. In yet other examples, number of control stations 404 may include a number of control stations in addition to primary control station 410 and secondary control station 412. In some advantageous embodiments, multi-mission system 400 may have a number of work areas in addition to work area 403 depending on the particular implementation. In these examples, number of control stations 404 may be distributed among the different work areas in different locations of aircraft 402.

In yet other advantageous embodiments, plurality of systems 408 may include systems in addition to those described. For example, plurality of systems 408 may include an engine functions system, a cockpit backup system for fuel management, a cockpit backup system for flight management, and/or other aircraft systems.

Figure 5:
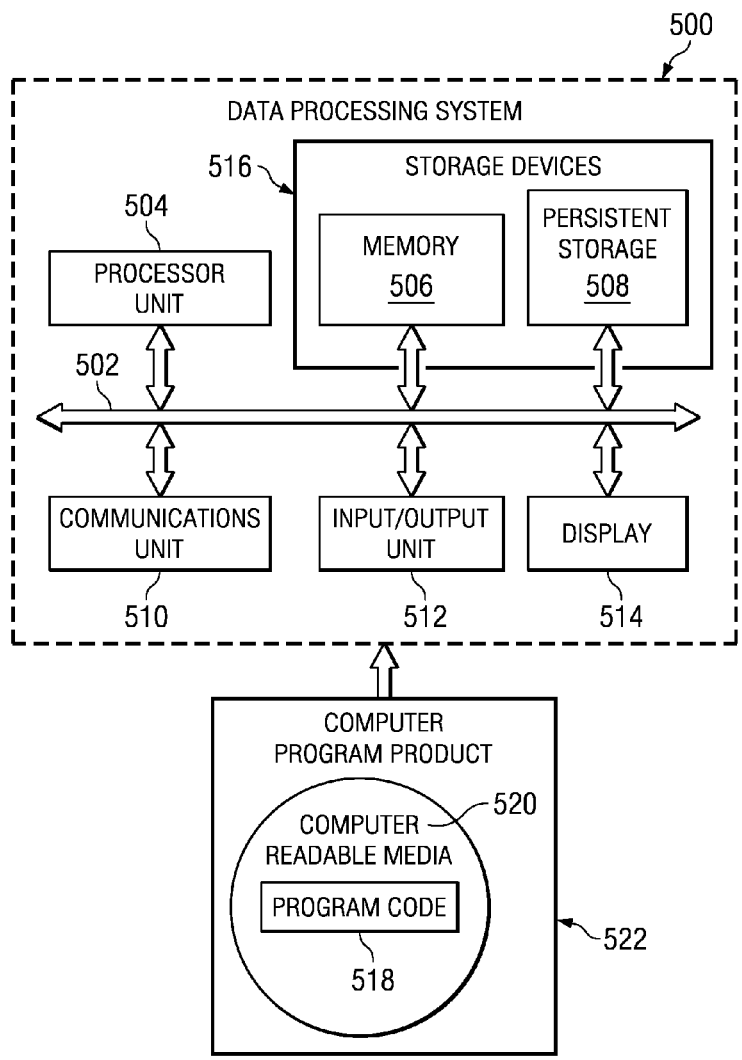
FIG. 5 is a diagram of a data processing system in accordance with an illustrative embodiment.

Turning now to FIG. 5, a diagram of a data processing system is depicted in accordance with an illustrative embodiment. Data processing system 500 is an example of a data processing system that may be used to implement a mission configuration system, such as mission configuration system 406 in FIG. 4. Additionally, data processing system 500 also may be used to implement one or more systems within plurality of systems 408 in multi-mission system 400 in FIG. 4.

In this illustrative example, data processing system 500 includes communications fabric 502, which provides communications between processor unit 504, memory 506, persistent storage 508, communications unit 510, input/output (I/O) unit 512, and display 514.

Processor unit 504 serves to execute instructions for software that may be loaded into memory 506. Processor unit 504 may be a set of one or more processors or may be a multi-processor core, depending on the particular implementation. Further, processor unit 504 may be implemented using one or more heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information such as, for example, without limitation, data, program code in functional form, and/or other suitable information either on a temporary basis and/or a permanent basis. Memory 506, in these examples, may be, for example, a random access memory or any other suitable volatile or non-volatile storage device.

Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for execution by processor unit 504. The processes of the different embodiments may be performed by processor unit 504 using computer implemented instructions, which may be located in a memory, such as memory 506.

These instructions are referred to as program code, computer usable program code, or computer readable program code that may be read and executed by a processor in processor unit 504. The program code in the different embodiments may be embodied on different physical or tangible computer readable media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these examples.

Program code 518 may be transferred to data processing system 500 from computer readable media 520 through a communications link to communications unit 510 and/or through a connection to input/output unit 512. The communications link and/or the connection may be physical or wireless in the illustrative examples. The computer readable media also may take the form of non-tangible media, such as communications links or wireless transmissions containing the program code.

In some illustrative embodiments, program code 518 may be downloaded over a network to persistent storage 508 from another device or data processing system for use within data processing system 500. For instance, program code stored in a computer readable storage medium in a server data processing system may be downloaded over a network from the server to data processing system 500. The data processing system providing program code 518 may be a server computer, a client computer, or some other device capable of storing and transmitting program code 518.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown.

Figure 6:
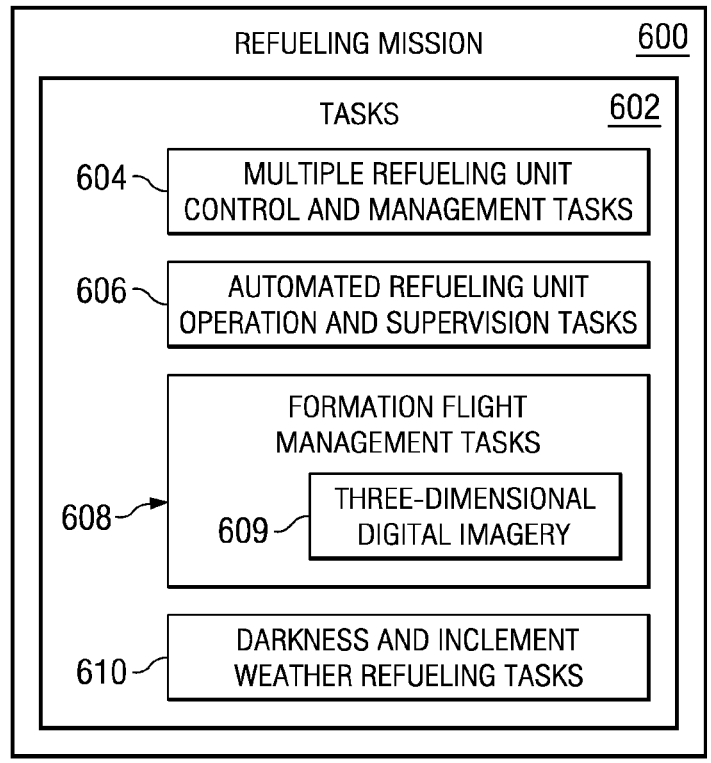
FIG. 6 is a block diagram for a refueling mission in accordance with an advantageous embodiment.

With reference now to FIG. 6, a block diagram for a refueling mission is depicted in accordance with an advantageous embodiment. In these examples, refueling mission 600 is an example of a mission that may be performed using multi-mission system 400 in FIG. 4.

Refueling mission 600 includes tasks 602, which include, for example, without limitation, multiple refueling unit control and management tasks 604, automated refueling unit operation and supervision tasks 606, formation flight management tasks 608, darkness and inclement weather refueling tasks 610, and/or other suitable types of refueling tasks.

Tasks 602 are performed at number of control stations 404 in multi-mission system 400 in FIG. 4. An operator may control different systems within plurality of systems 408 in FIG. 4 to perform refueling mission 600.

Multiple refueling unit control and management tasks 604 involve operating multiple refueling booms and/or hose and drogue units on a single refueling aircraft. For example, simultaneous refueling boom tasks for multiple booms may require more than one control station, such as number of control stations 404 in FIG. 4. Automated refueling unit operation and supervision tasks 606 may be performed at number of control stations 404 to allow an operator to operate and/or supervise automated refueling units if automation fails and/or becomes unreliable. These refueling units may be either semi-automated or fully automated refueling booms or hose and drogue units. In these examples, both multiple refueling unit control and management tasks 604 and automated refueling unit operation and supervision tasks 606 are performed using refueling system 428 in FIG. 4.

Formation flight involves two or more aircraft being brought into close proximity to one another in the air. Formation flight management tasks 608 may be performed to control formation flight between a refueling aircraft and one or more receiver aircraft. These tasks may be performed using air traffic management system 434 in FIG. 4. As more aircraft become involved, additional personnel and/or computer systems may be required. Multi-mission system 400 in FIG. 4 may provide improved formation flight management through the use of number of control stations 404.

Further, the performance of formation flight management tasks 608 may also involve using three-dimensional digital imagery 609. Three-dimensional digital imagery 609 may be obtained using stereoscopic digitized cameras. These types of cameras may provide improved image quality under poor lighting and/or weather conditions. In this illustrative example, formation flight management tasks 608 may be performed using both air traffic management system 434 and vision system 437 in FIG. 4.

Darkness and inclement weather refueling tasks 610 involve controlling a refueling boom or hose and drogue unit during darkness and/or inclement weather conditions. Inclement weather conditions may include heavy rain, thunderstorms, snowstorms, and/or other such weather conditions. These tasks may be performed at number of control stations 404. Further, these tasks may involve the use of sensors 438 in the form of infrared cameras, weather sensors, and/or other suitable types of sensors. Thus, darkness and inclement weather refueling tasks 610 may be performed using refueling system 428, vision system 437, and weather system 439.

In these illustrative examples, plurality of systems 408 in FIG. 4 may be used during a mission with a single aircraft in a number of different ways to allow for improved efficiency in performing refueling missions. Multi-mission system 400 in FIG. 4 allows one or more operators to control and operate these systems in an integrated manner to provide safer and/or more efficient refueling. Multi-mission system 400 allows for these tasks to be performed using a single aircraft rather than using multiple aircraft to perform the tasks described above while refueling aircraft.

Figure 7:
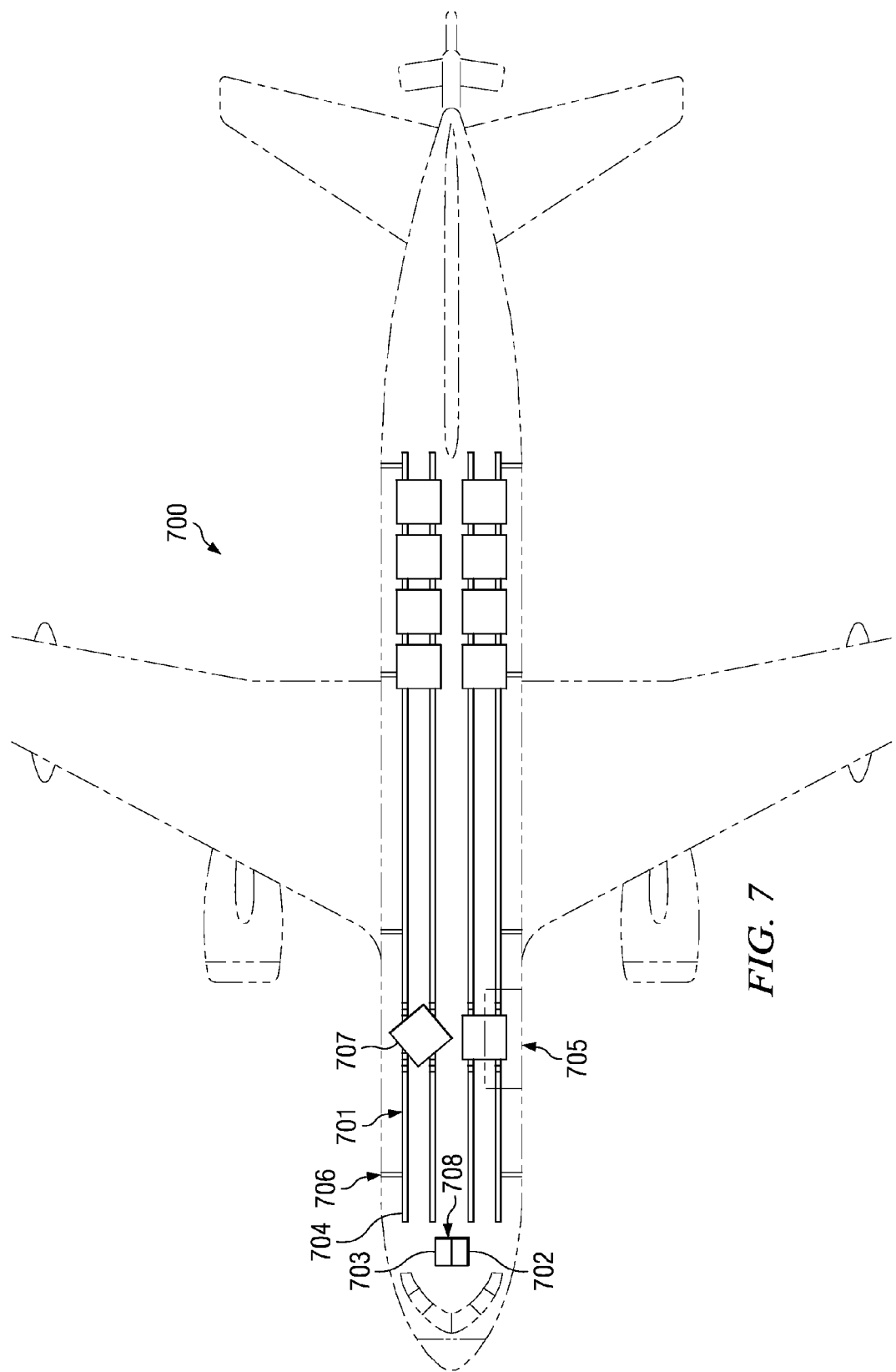
FIG. 7 is an illustration of an aircraft in accordance with an advantageous embodiment.

With reference now to FIG. 7, an illustration of an aircraft is depicted in accordance with an advantageous embodiment. Aircraft 700 is one example of one implementation of aircraft 402 in FIG. 4. In these examples, aircraft 700 is a refueling aircraft.

In these illustrative examples, aircraft 700 is configured for a cargo handling mission. Cargo handling system 701 performs tasks for the cargo handling mission. Cargo handling system 701 is one example of one implementation for a cargo handling system such as, for example, cargo handling system 430 in FIG. 4.

Aircraft 700 has work area 708 with control station 702 and control station 703. In these examples, control station 702 and control station 703 are used to control cargo handling system 701 as well as other systems in aircraft 700.

In these illustrated examples, cargo handling system 701 includes components such as, for example, without limitation, cargo door 705, conveyors 704, and/or other components. Cargo 707 is loaded and unloaded into and out of aircraft 700 using cargo door 705 in cargo handling system 701. Cargo handling system 701 in aircraft 700 also has conveyors 704. Conveyors 704 may be used to move cargo 707 within aircraft 700. Sensors 706 in the floor of aircraft 700 may be used to determine weight and balance information for cargo 707. This weight and balance information may be accessed by an operator at control station 702 and control station 703. Further, an operator may control movement of cargo along conveyors 704 at control station 702 and control station 703.

Figure 8:
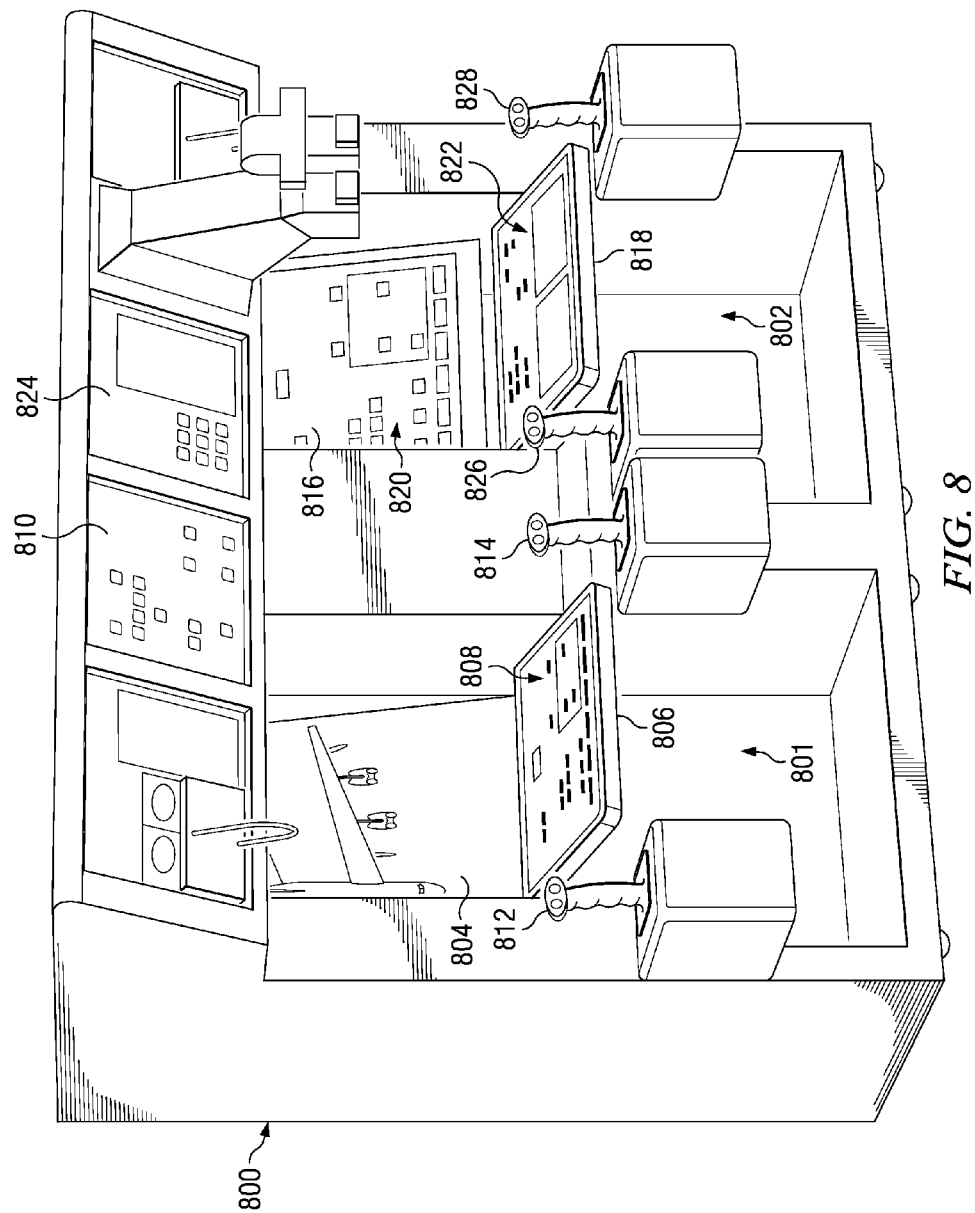
FIG. 8 is an illustration of a work area with control stations is depicted in accordance with an advantageous embodiment.

With reference now to FIG. 8, an illustration of a work area with control stations is depicted in accordance with an advantageous embodiment. Work area 800 is one example of one implementation of work area 403 in FIG. 4. In these illustrative examples, work area 800 has primary control station 801 and secondary control station 802. Primary controls station 801 and secondary control station 802 are examples of implementations of primary control station 410 and secondary control station 412 in FIG. 4.

In these illustrative examples, primary control station 801 has display 804 and touchscreen display 806. Touchscreen display 806 has touchscreen controls 808. These controls are used to control systems for an aircraft such as, for example, plurality of systems 408 for aircraft 402 in FIG. 4. Primary control station 801 also has additional controls 810, control stick 812, and control stick 814.

In a similar manner, secondary control station 802 has touchscreen display 816 and touchscreen display 818. Touchscreen display 816 has touchscreen controls 820, and touchscreen display 818 has touchscreen controls 822. Further, secondary control station 802 has additional controls 824, control stick 826, and control stick 828.

In other advantageous embodiments, primary control station 801 and secondary control station 802 may take the form of other types of computer devices or portable devices. For example, in some advantageous embodiments, secondary control station 802 may take the form of a laptop computer. Further, in yet other advantageous embodiments, primary control station 801 and secondary control station 802 may be in locations not next to each other. For example, primary control station 801 may be located towards the front of an aircraft, and secondary control station 802 may be located towards the rear of an aircraft.

Figure 9:
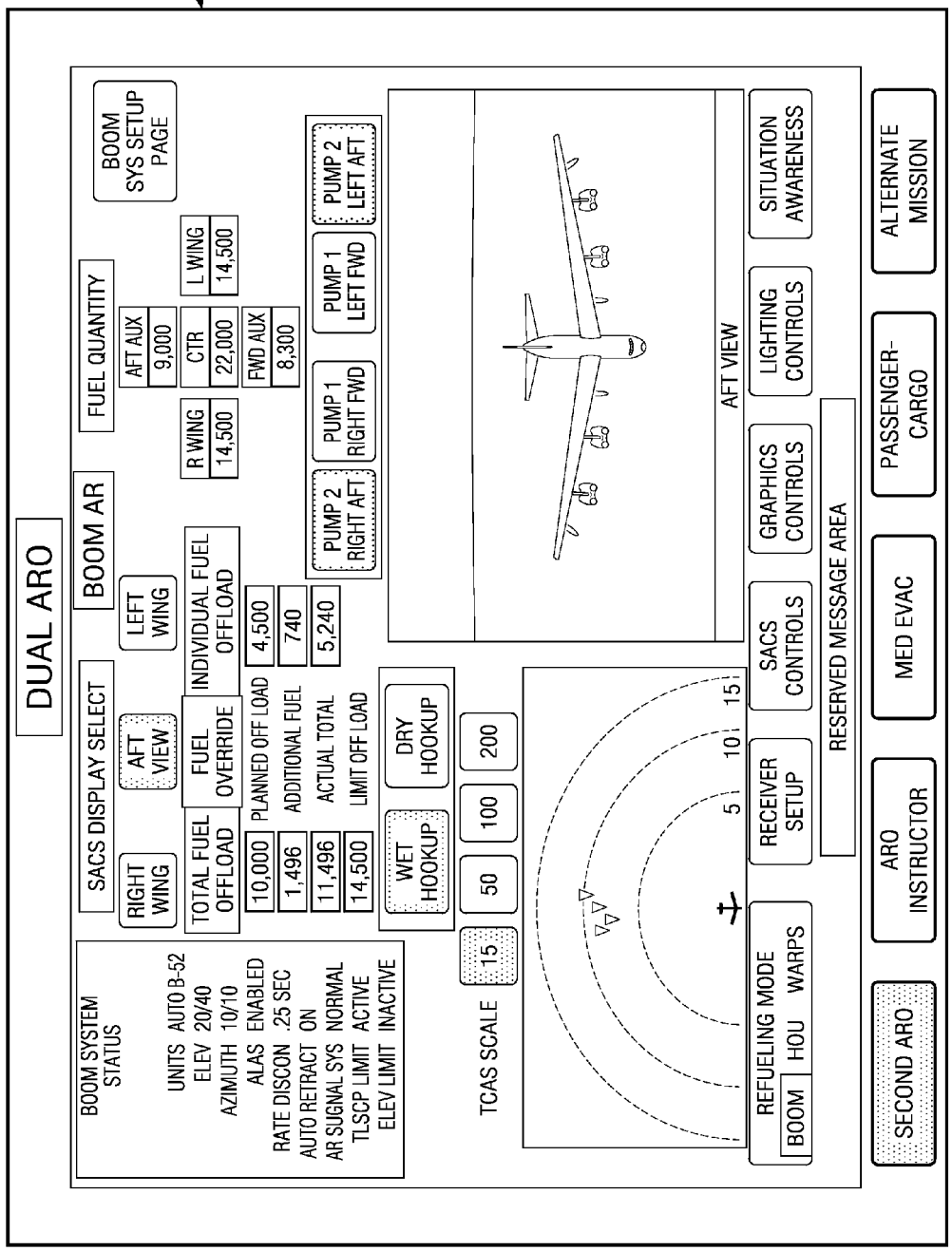
FIG. 9 is an illustration of a graphical user interface for use at a control station in accordance with an advantageous embodiment.

With reference now to FIG. 9, an illustration of a graphical user interface for use at a control station is depicted in accordance with an advantageous embodiment. Graphical user interface 900 is one example of an implementation of a graphical user interface, such as graphical user interface 415 and/or graphical user interface 417 in FIG. 4. In this illustrative example, graphical user interface 900 is used for controlling a refueling system at a secondary control station such as, for example, secondary control station 412 in FIG. 4. This refueling system may be, for example, refueling system 428 in FIG. 4.

With reference now to FIG. 10, an illustration of a graphical user interface for use at a control station is depicted in accordance with an advantageous embodiment. Graphical user interface 1000 is one example of an implementation of a graphical user interface, such as graphical user interface 415 and/or graphical user interface 417 in FIG. 4.

In this illustrative example, graphical user interface 1000 is used for controlling a cargo handling system and a passenger transportation system at a secondary control station such as, for example, secondary control station 412 in FIG. 4. The cargo handling system may be, for example, cargo handling system 430 in FIG. 4, and the passenger transportation system may be, for example, passenger transportation system 435 in FIG. 4. In these examples, graphical user interface 1000 provides an example of an implementation for allowing an operator control of multiple systems using one graphical user interface.

Figure 11:
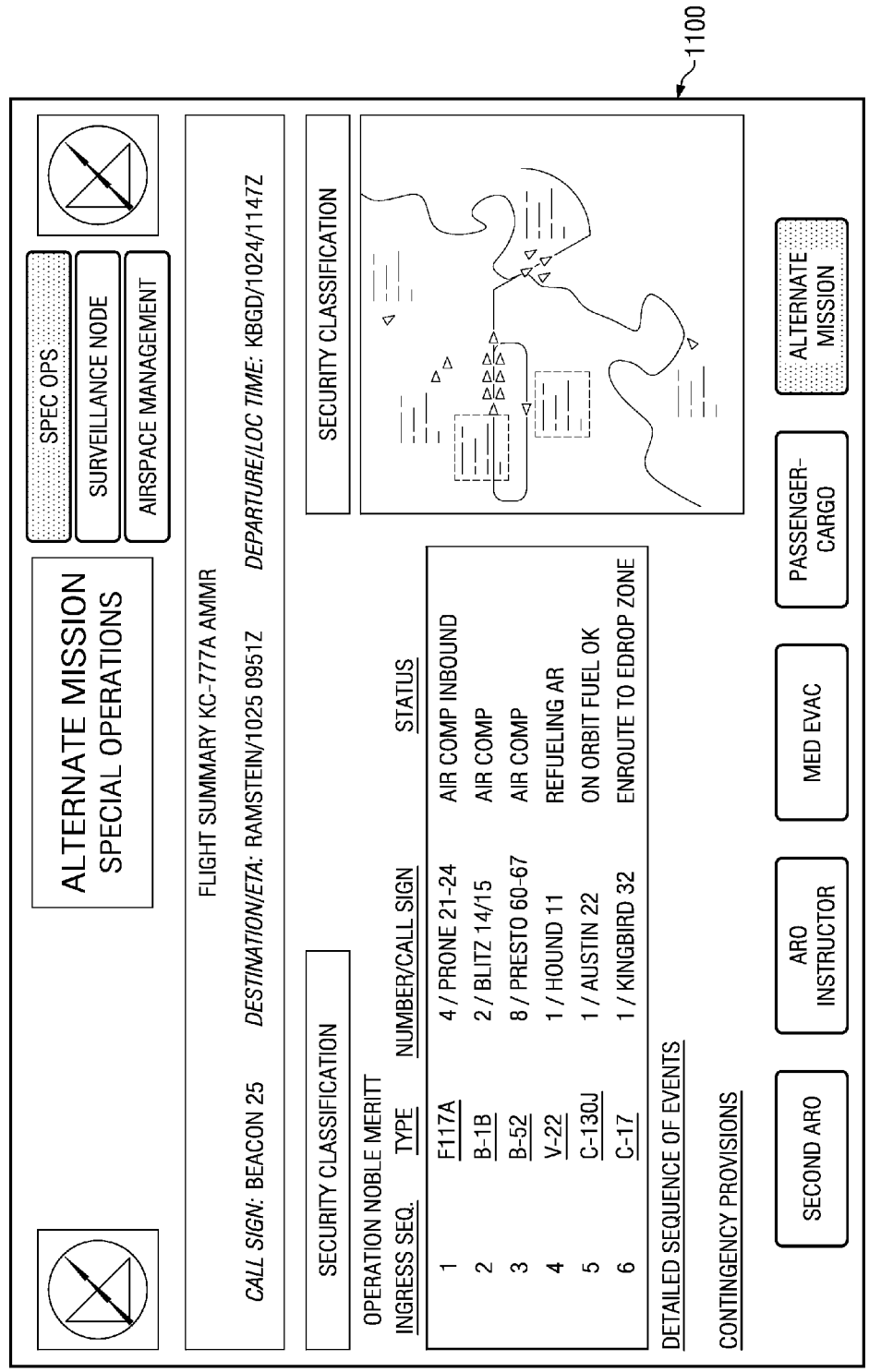
FIG. 11 is an illustration of a graphical user interface for use at a control station in accordance with an advantageous embodiment.

With reference now to FIG. 11, an illustration of a graphical user interface for use at a control station is depicted in accordance with an advantageous embodiment. Graphical user interface 1100 is one example of an implementation of a graphical user interface, such as graphical user interface 415 and/or graphical user interface 417 in FIG. 4. In this illustrative example, graphical user interface 1100 is used for controlling a special operations system at a secondary control station such as, for example, secondary control station 412 in FIG. 4. The special operations system may be, for example, special operations system 432 in FIG. 4.

With reference now to FIG. 12, an illustration of a graphical user interface for use at a control station is depicted in accordance with an advantageous embodiment. Graphical user interface 1200 is one example of an implementation of a graphical user interface, such as graphical user interface 415 and/or graphical user interface 417 in FIG. 4. In this illustrative example, graphical user interface 1200 is used for controlling a medical evacuation system at a secondary control station such as, for example, secondary control station 412 in FIG. 4. The medical evacuation system may be, for example, medical evacuation system 436 in FIG. 4.

Figure 13:
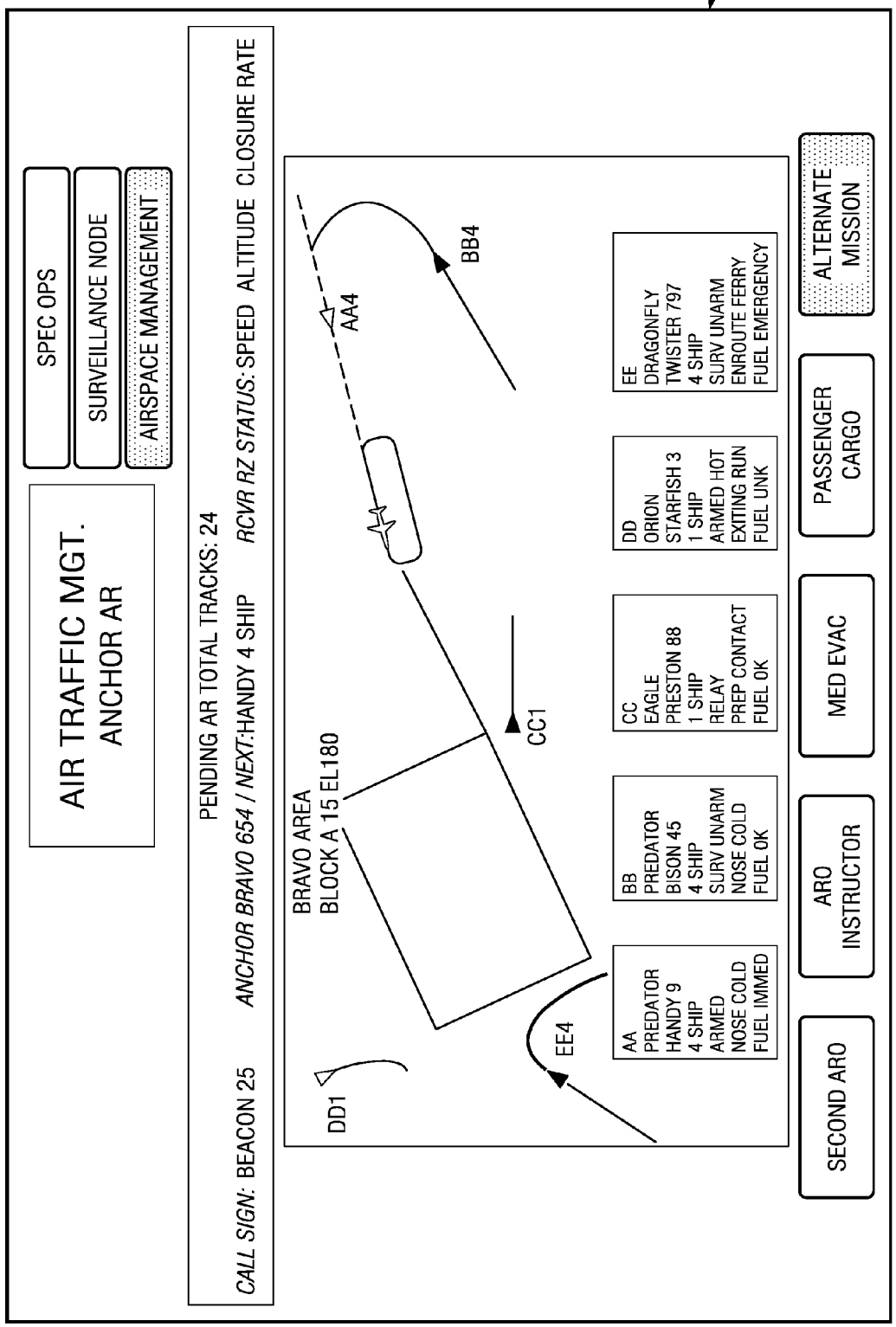
FIG. 13 is an illustration of a graphical user interface for use at a control station in accordance with an advantageous embodiment.

With reference now to FIG. 13, an illustration of a graphical user interface for use at a control station is depicted in accordance with an advantageous embodiment. Graphical user interface 1300 is one example of an implementation of a graphical user interface, such as graphical user interface 415 and/or graphical user interface 417 in FIG. 4. In this illustrative example, graphical user interface 1300 is used for controlling an air traffic management system at a secondary control station such as, for example, secondary control station 412 in FIG. 4. The air traffic management system may be, for example, air traffic management system 434 in FIG. 4.

The illustrations of the graphical user interfaces in FIGS. 9-13 are not meant to imply limitations to the manner in which the different advantageous embodiments may be implemented. These graphical user interfaces are presented as example implementations and represent only a few of the many ways in which the advantageous embodiments may be implemented.

Figure 14:
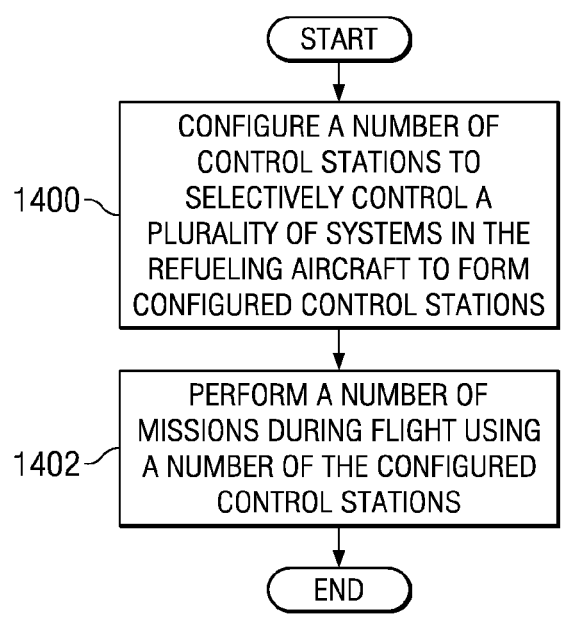
FIG. 14 is a flowchart of a process for performing missions with a refueling aircraft in accordance with an advantageous embodiment.

With reference now to FIG. 14, a flowchart of a process for performing missions with a refueling aircraft is depicted in accordance with an advantageous embodiment. The process illustrated in FIG. 14 may be implemented using a multi-mission system such as, for example, multi-mission system 400 in FIG. 4.

The process begins by configuring a number of control stations to selectively control a plurality of systems in the refueling aircraft to form a number of configured control stations (operation 1400). The number of control stations may be configured using a mission configuration system such as, for example, mission configuration system 406 in FIG. 4. The mission configuration system facilitates the exchange of information between the number of control stations and the plurality of systems. The plurality of systems includes a refueling system and a number of other systems. Each of the plurality of systems is capable of performing a number of different tasks. The control stations are configured to allow a configured control station to control a selected system within the plurality of systems.

Thereafter, the process performs a number of missions during flight using the number of configured control stations (operation 1402), with the process terminating thereafter.

Figure 15:
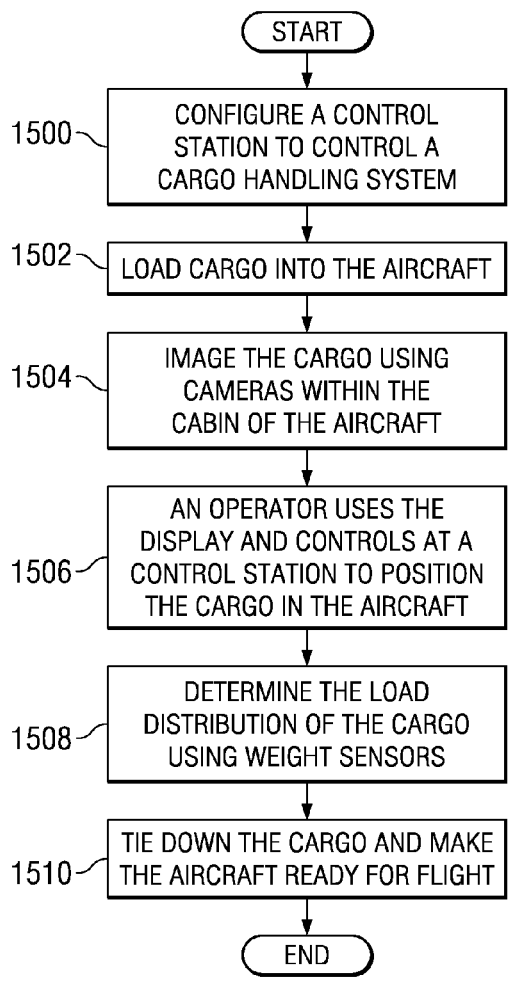
FIG. 15 is a flowchart of a process for performing a cargo handling mission in accordance with an advantageous embodiment.

With reference now to FIG. 15, a flowchart of a process for performing a cargo handling mission is depicted in accordance with an advantageous embodiment. This process may be implemented using multi-mission system 400 and cargo handling system 430 in FIG. 4.

The process begins by configuring a control station to control a cargo handling system (operation 1500). The cargo is loaded into the aircraft (operation 1502). The cargo is then imaged by cameras within the cabin of the aircraft (operation 1504). Thereafter, an operator at a control station uses the display and controls at the control station to position the cargo in the aircraft (operation 1506). The process then determines the load distribution of the cargo using weight sensors (operation 1508). The cargo is then tied down and the aircraft is made ready for flight (operation 1510), with the process terminating thereafter. In a similar manner, the process may be reversed for unloading cargo from an aircraft.

Figure 16:
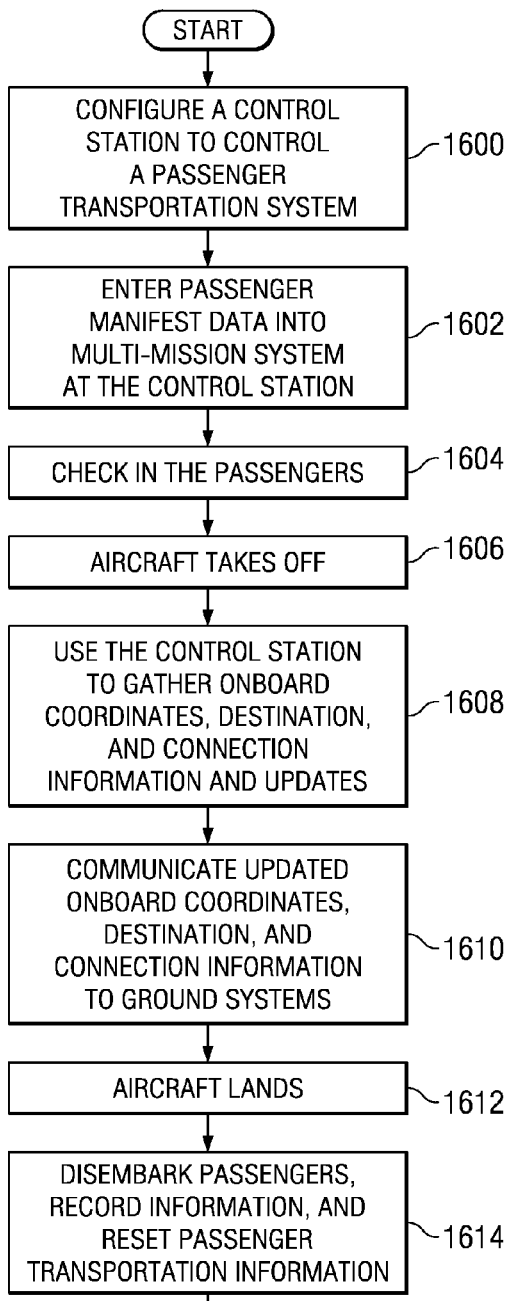
FIG. 16 is a flowchart of a process for performing a passenger carrying mission in accordance with an advantageous embodiment.

With reference now to FIG. 16, a flowchart of a process for performing a passenger carrying mission is depicted in accordance with an advantageous embodiment. This process may be implemented using multi-mission system 400 and passenger transportation system 435 for aircraft 402 in FIG. 4.

The process begins by configuring a control station to control the passenger transportation system (operation 1600). Passenger manifest data is then entered into the multi-mission system at the control station (operation 1602). The passengers are then checked in (1604), and the aircraft takes off (operation 1606).

Thereafter, the control station is used to gather onboard coordinates, destination, and connection information and updates (operation 1608). The updated onboard coordinates, destination, and connection information is communicated to ground systems (operation 1610). The aircraft then lands (operation 1612). Thereafter, the process disembarks passengers, records information, and resets the passenger transportation system information (operation 1614), with the process terminating thereafter.

Figure 17:
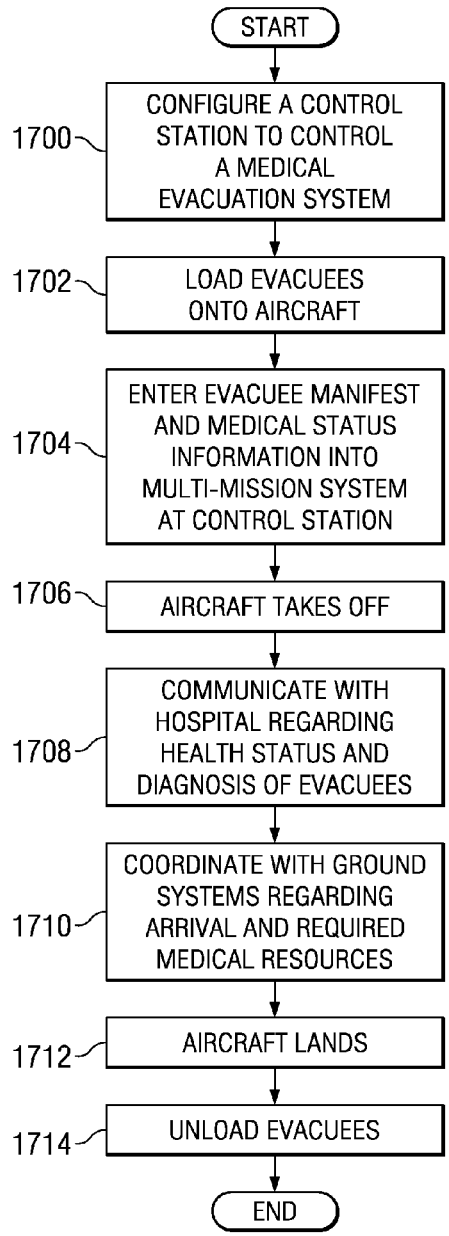
FIG. 17 is a flowchart of a process for performing a medical evacuation mission in accordance with an advantageous embodiment.

With reference now to FIG. 17, a flowchart of a process for performing a medical evacuation mission is depicted in accordance with an advantageous embodiment. Further, the process illustrated in FIG. 17 may be used to perform a medical evacuation mission. This process may be implemented using multi-mission system 400 and medical evacuation system 436 for aircraft 402 in FIG. 4.

The process begins by configuring a control station to control the medical evacuation system (operation 1700). Evacuees are loaded onto the aircraft (operation 1702). The evacuee manifest and medical status information are entered into the multi-mission system at the control station (operation 1704). Thereafter, the aircraft takes off (operation 1706).

The process then communicates with a hospital regarding the health status and diagnosis of the evacuees (operation 1708). The process then coordinates with ground systems regarding the arrival of the aircraft and required medical resources (operation 1710). For example, an operator at the control station may communicate with a hospital and ground systems regarding any necessary medical supplies that may be required upon arrival. The aircraft then lands (operation 1712), and the evacuees are unloaded (operation 1714), with the process terminating thereafter.

Figure 18:
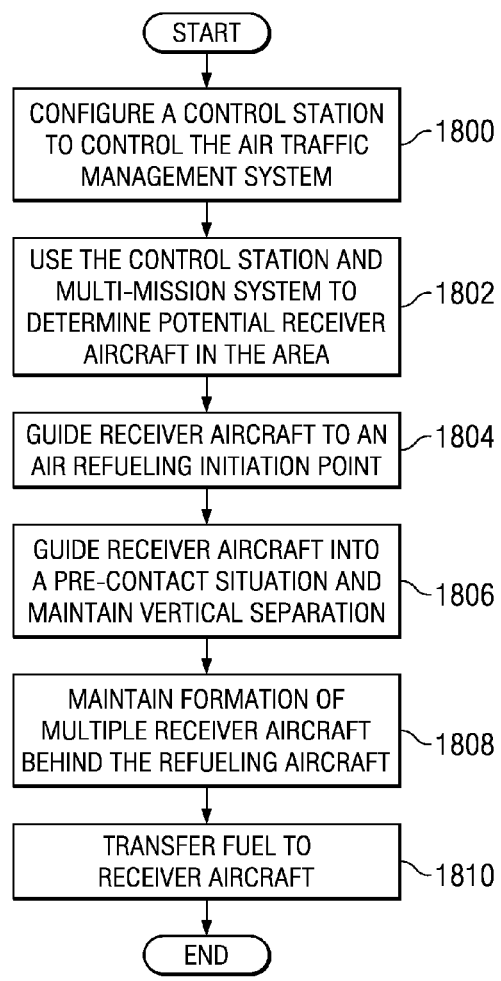
FIG. 18 is a flowchart of a process for performing an air traffic control mission in accordance with an advantageous embodiment.

With reference now to FIG. 18, a flowchart of a process for performing an air traffic control mission is depicted in accordance with an advantageous embodiment. This process may be implemented using multi-mission system 400 and air traffic management system 434 for aircraft 402 in FIG. 4.

The process begins by configuring a control station to control the air traffic management system (operation 1800). The control station and multi-mission system are used to determine potential receiver aircraft in the area (operation 1802). The receiver aircraft is guided to an air refueling initiation point (operation 1804). The receiver aircraft is then guided into a pre-contact situation and vertical separation between the receiver aircraft and the refueling aircraft is maintained (operation 1806). The process then maintains the formation of multiple receiver aircraft behind the refueling aircraft (operation 1808). Thereafter, fuel is transferred to the receiver aircraft (operation 1810), with the process terminating thereafter.

Figure 19:
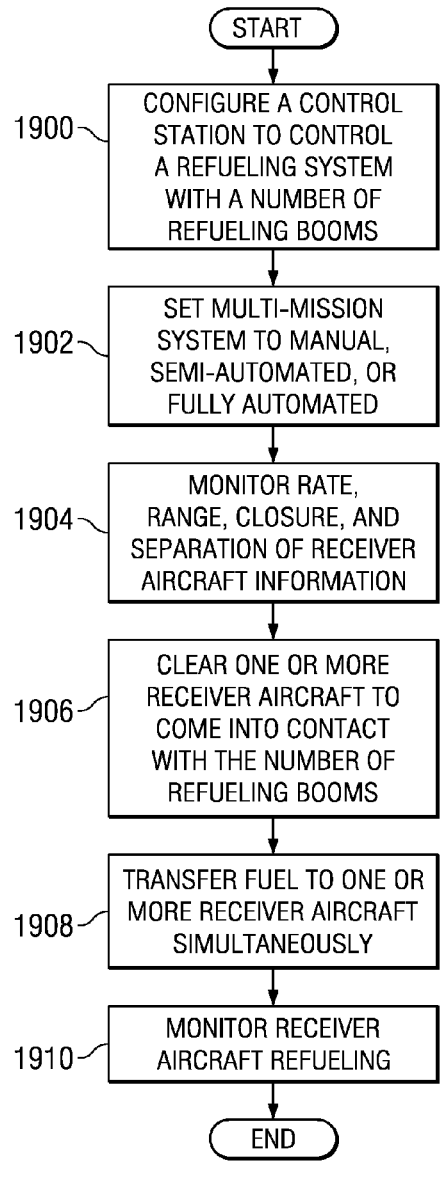
FIG. 19 is a flowchart of a process for performing a refueling mission in accordance with an advantageous embodiment.

With reference now to FIG. 19, a flowchart of a process for performing a refueling mission is depicted in accordance with an advantageous embodiment. This process may be implemented using multi-mission system 400 and refueling system 428 for aircraft 402 in FIG. 4.

The process begins by configuring a control station to control a refueling system with a number of refueling booms (operation 1900). The multi-mission system is set to manual, semi-automated, or fully automated (operation 1902). In this manner the multi-mission system is capable of controlling manual, semi-automated, and/or fully automated refueling booms. The rate, range, closure, and separation of the receiver aircraft in formation are monitored (operation 1904). Thereafter, one or more of the receiver aircraft are cleared to come into contact with the number of refueling booms (operation 1906). Fuel is transferred to one or more of the receiver aircraft simultaneously (operation 1908). Refueling of the receiver aircraft is monitored (operation 1910), with the process terminating thereafter.

Figure 20:
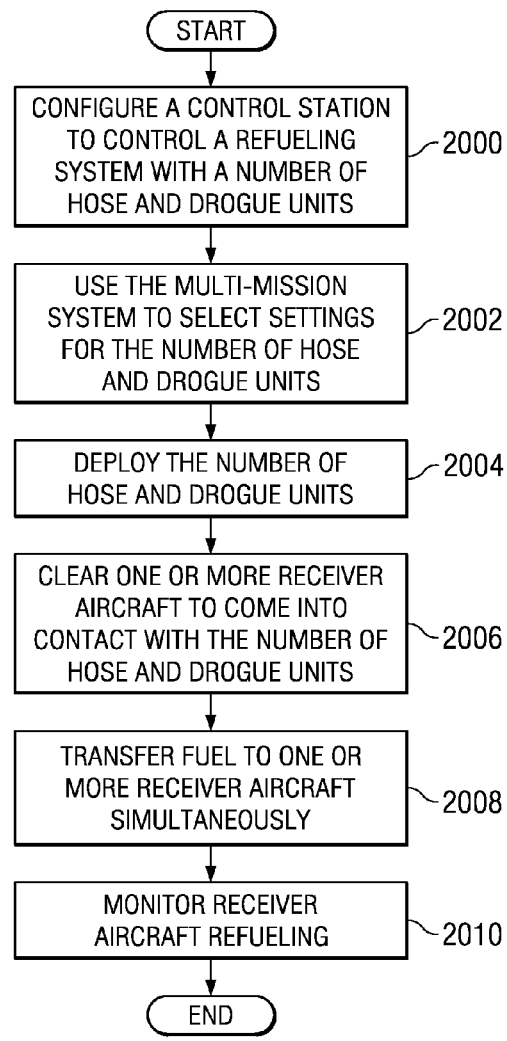
FIG. 20 is a flowchart of a process for performing a refueling mission in accordance with an advantageous embodiment.

With reference now to FIG. 20, a flowchart of a process for performing a refueling mission is depicted in accordance with an advantageous embodiment. This process may be implemented using multi-mission system 400 and refueling system 428 for aircraft 402 in FIG. 4.

The process begins by configuring a control station to control a refueling system with a number of hose and drogue units (operation 2000). The multi-mission system is used to select settings for the number of hose and drogue units (operation 2002). These settings may be selected based on the aerodynamic profiles of the specific receiver aircraft as well as the shapes of the receiver aircraft and receiver baskets for the hose and drogue units. Further, these settings may be selected based on airspeeds of the refueling aircraft and receiver aircraft. One example of a setting may be the catenary for the hose and drogue unit. The multi-mission system may also be used to control variable speed hose and drogue units.

The process then deploys the number of hose and drogue units (operation 2004). Thereafter, one or more of the receiver aircraft are cleared to come into contact with the number of hose and drogue units (operation 2006). Fuel is transferred to one or more of the receiver aircraft simultaneously (operation 2008). Refueling of the receiver aircraft is monitored (operation 2010), with the process terminating thereafter.

Figure 21:
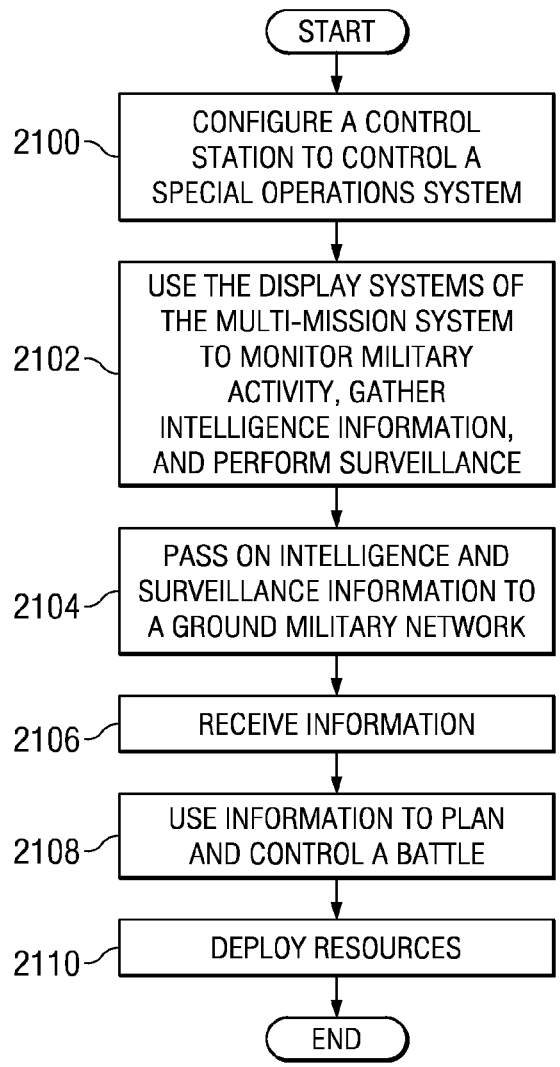
FIG. 21 is a flowchart of a process for performing a special operations mission in accordance with an advantageous embodiment.

With reference now to FIG. 21, a flowchart of a process for performing a special operations mission is depicted in accordance with an advantageous embodiment. This process may be implemented using multi-mission system 400 and special operations system 432 for aircraft 402 in FIG. 4.

The process begins by configuring a control station to control the special operations system (operation 2100). The display systems of the multi-mission are used to monitor military activity, gather intelligence information, and perform surveillance (operation 2102). For example, military activity may be monitored for both friend and foe activity. Thereafter, intelligence information and surveillance information may be passed on to a ground military network (operation 2104). The multi-mission system may receive information from the ground military network (operation 2106). For example, this information may include strategic battle information, instructions for battle, commands, and/or other information.

Thereafter, the received information may be used to plan and control a battle (operation 2108) and deploy resources (operation 2110), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a refueling aircraft that can be configured to perform different missions. The refueling aircraft comprises a fuselage, a plurality of flight surfaces, an engine system, a refueling system, a number of other systems, and a number of control stations. The plurality of flight surfaces is associated with the fuselage, and the engine system is capable of moving the refueling aircraft during flight. The refueling system is capable of performing a refueling mission during the flight. The number of other systems are each capable of performing another mission in addition to the refueling mission. The number of control stations is located in the fuselage of the refueling aircraft, wherein each of the number of control stations is capable of being configured to control any of the refueling systems and the number of other systems prior to performing a selected mission.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to parts for an aircraft, other advantageous embodiments may be applied to parts for other types of objects. For example, without limitation, other advantageous embodiments may be applied to parts for a mobile platform, a stationary platform, a land-based structure, an aquatic-based structure, a space-based structure, and/or some other suitable object.

More specifically, the different advantageous embodiments may be applied to, for example, without limitation, parts for a submarine, a bus, a personnel carrier, a tank, a train, an automobile, a spacecraft, a space station, a satellite, a surface ship, a power plant, a dam, a manufacturing facility, a building, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A refueling aircraft comprising:
   a fuselage;
   a plurality of flight surfaces associated with the fuselage;
   an engine system configured to move the refueling aircraft during flight;
   a refueling system configured to perform a refueling mission during the flight;
   one or more other systems, wherein each of the one or more other systems is configured to perform one or more missions in addition to the refueling mission, wherein the one or more missions comprise a group of tasks, and wherein the group of tasks comprises: a multiple refueling unit control and management task, an automated refueling unit operation and supervision task, a formation flight management task, and a darkness and inclement weather refueling task; and
   one or more control stations located in the fuselage of the refueling aircraft, wherein each of the one or more control stations is configured to control the refueling system and a group of systems, wherein the group of systems consists of: a cargo handling system, a special operations system, an air traffic management system, a passenger transportation system, a medical evacuation system, a vision system, a weather system, a sensor system, an actuator system, and an electrical connection system, and wherein each of the one or more control stations is connected to a mission configuration system, further wherein the mission configuration system is configured to configure each of the one or more control stations.

2. The refueling aircraft of claim 1, wherein one or more control stations is located in at least one work area.

3. An apparatus comprising:
   one or more control stations located in a fuselage of a refueling aircraft, wherein the one or more control stations are configured to control any of a refueling system and one or more other systems prior to performing a selected mission; and
   a mission configuration system connected to: the refueling system in the refueling aircraft, the one or more other systems in the refueling aircraft, and the one or more control stations, wherein the mission configuration system is configured to perform functions, the functions comprising: configure the one or more control stations, exchange information between: the refueling system, the one or more other systems, and the one or more control station stations, wherein the one or more other systems comprise a group consisting of: a cargo handling system, a special operations system, an air traffic management system, a passenger transportation system, a medical evacuation system, a vision system, a weather system, a sensor system, an actuator system, and an electrical connection system; and
   integrate the one or more control stations to perform a mission comprising a group of tasks, wherein the group of tasks comprises: a multiple refueling unit control and management task, an automated refueling unit operation and supervision task, a formation flight management task, and a darkness and inclement weather refueling task.

4. The refueling aircraft of claim 1, wherein the one or more control stations comprises:
   a primary control station; and
   a secondary control station.

5. The refueling aircraft of claim 4, wherein the primary control station controls the refueling system to perform the refueling mission while the secondary control station controls one of the one or more other systems to perform one of the one or more missions.

6. The refueling aircraft of claim 1, wherein each of the one or more control stations is configured to control a system selected from one of the refueling system and the one or more other systems independently from another of the one or more control stations.

7. The refueling aircraft of claim 1, wherein the one or more missions is selected from at least one of a cargo handling mission, a special operations mission, a formation flight management mission, a darkness and inclement weather refueling mission, a medical evacuation mission, an air traffic management mission, an intelligence mission, a reconnaissance mission, and a surveillance mission.

8. The refueling aircraft of claim 1, wherein the one or more control stations are each configured to perform the refueling mission for a plurality of aircraft.

9. The refueling aircraft of claim 1 further comprising:
   a graphical user interface configured to display at a control station in the one or more control stations and configured to provide an interface for use in a mission selected from the refueling mission and the one or more missions for the control station.

10. The refueling aircraft of claim 1, wherein the refueling system is a first refueling system, wherein the one or more other systems comprises a second refueling system, wherein a first control station in the one or more control stations is configured to control the first refueling system, and wherein a second control station in the one or more control stations is configured to control the second refueling system.

11. The refueling aircraft of claim 10, wherein the one or more other systems includes at least one of a cargo handling system, a special operations system, an air traffic management system, a passenger transportation system, a medical evacuation system, a weather system, and a vision system, wherein the vision system comprises: data collected by sensors, three-dimensional digital imagery, infrared cameras, stereoscopic cameras, and night vision cameras.

12. A method for performing missions with a refueling aircraft, the method comprising:
   configuring one or more control stations to selectively control a plurality of systems in the refueling aircraft to form one or more configured control stations, wherein the plurality of systems includes a refueling system and one or more other systems, and wherein each of the plurality of systems is configured to perform a mission within one or more missions, wherein the one or more missions comprise a group of tasks, and wherein the group of tasks comprises: a multiple refueling unit control and management task, an automated refueling unit operation and supervision task, a formation flight management task, and a darkness and inclement weather refueling task, and wherein each of the one or more control stations is connected to a mission configuration system, further wherein the mission configuration system is configured to configure each of the one or more control stations, and wherein each of the one or more control stations is configured to control the refueling system and a group of systems, wherein the group of systems consists of: a cargo handling system, a special operations system, an air traffic management system, a passenger transportation system, a medical evacuation system, a vision system, a weather system, a sensor system, an actuator system, and an electrical connection system; and performing the number of one or more missions during a flight using the one or more configured control stations.

13. The method of claim 12, wherein the one or more control stations are located in at least one work area.

14. The method of claim 12, wherein the one or more missions is selected from at least one of a cargo carrying mission, a special operations mission, a formation flight management mission, a darkness and inclement weather refueling mission, a medical evacuation mission, an air traffic management mission, an intelligence mission, a reconnaissance mission, and a surveillance mission.

15. The method of claim 12 further comprising:
reconfiguring the one or more configured control stations during the flight to perform a mission in addition to the one or more missions during the flight.

16. The method of claim 12 further comprising:
displaying a user interface at a configured control station in the one or more configured control stations based on a mission in the one or more missions selected for the configured control station.

17. The method of claim 12, wherein the performing step comprises:

performing a refueling mission using a first configured control station in the one or more configured control stations, wherein the first configured control station is configured to control the refueling system in the plurality of systems for the refueling mission; and performing a mission in the one or more missions, while the refueling mission is being performed, using a second configured control station in the one or more configured control stations, wherein the second configured control station is configured to control one or more associated systems in the one or more other systems.

18. The method of claim 12, wherein the one or more other systems include at least one of a cargo handling system, a special operations system, an air traffic management system, a passenger transportation system, a medical evacuation system, a weather system, and a vision system, wherein the vision system comprises: data collected by sensors, three-dimensional digital imagery, infrared cameras, stereoscopic cameras, and night vision cameras.

19. The method of claim 17, wherein the refueling mission is a first refueling mission and the refueling system is a first refueling system and further comprising:
performing a second refueling mission using a third configured control station in the one or more configured control stations, wherein the third configured control station is configured to control a second refueling system in the one or more other systems for the second refueling mission, and wherein the second refueling mission is performed during a portion of the first refueling mission.

20. The method of claim 19, wherein the second refueling mission is performed during a portion of the first refueling mission.

* * * * *